United States Patent [19]
Merving

[11] Patent Number: 5,459,961
[45] Date of Patent: * Oct. 24, 1995

[54] CAPSULE FOR TREATING WOODEN ELEMENT

[76] Inventor: Hans A. K. Merving, August Stalbergsvag 10A, 644 00 Torshälla, Sweden

[*] Notice: The portion of the term of this patent subsequent to May 4, 2010 has been disclaimed.

[21] Appl. No.: 29,428

[22] Filed: Mar. 9, 1993

Related U.S. Application Data

[63] Continuation-in-part of Ser. No. 555,734, Jul. 23, 1990, Pat. No. 5,207,021, which is a continuation-in-part of Ser. No. 410,884, Sep. 22, 1989, Pat. No. 5,010,684, which is a continuation-in-part of Ser. No. 393,841, Aug. 7, 1989, Pat. No. 4,905,410, which is a continuation of Ser. No. 184,072, Apr. 20, 1988, abandoned.

[51] Int. Cl.⁶ ................................................. A01G 29/00
[52] U.S. Cl. ............................................................ 47/57.5
[58] Field of Search ...................................... 47/57.5, 48.5

[56] References Cited

U.S. PATENT DOCUMENTS 5,010,684  4/1991  Merving ........................... 47/57.5

Primary Examiner—Ramon S. Britts
Assistant Examiner—Joanne C. Downs
Attorney, Agent, or Firm—Keck, Mahin & Cate

[57] ABSTRACT

A capsule for treating a tree or other wooden element is disclosed as including a head element having a shank portion with an internal cavity containing a chemical agent. The internal cavity is sealed by a plug in an end of the shank portion remote from the head element. The head element, shank portion, chemical agent and plug form a self-contained unit which is inserted into a pre-drilled or pre-punched hole in the tree or other wooden element. The shank portion is made of a frangible material so that upon breaking as a result of an impact force applied to the head element, the chemical agent is free to be absorbed into the tree or other wooden element.

17 Claims, 3 Drawing Sheets

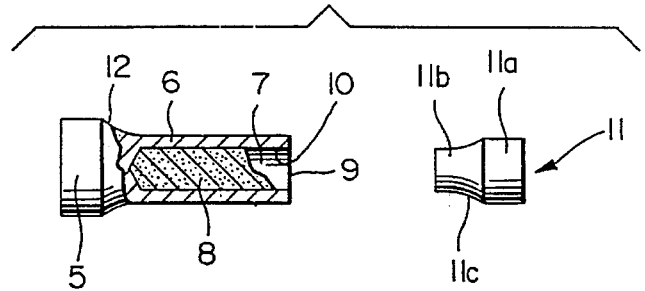
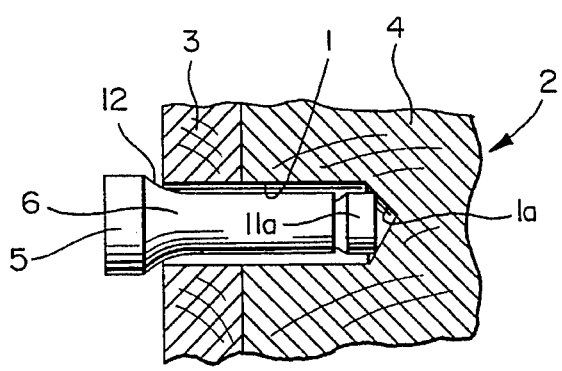
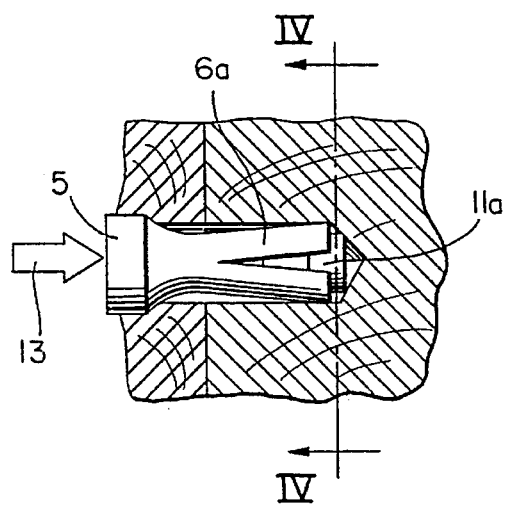
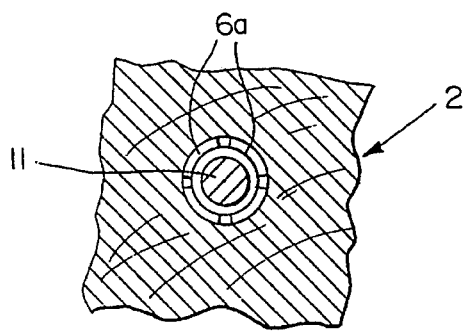

CAPSULE FOR TREATING WOODEN ELEMENT

This application is a continuation-in-part of U.S. patent application Ser. No. 07/555,734, filed Jul. 23, 1990, now U.S. Pat. No. 5,207,021, which is a continuation-in-part of U.S. patent application Ser. No. 07/410,884, filed Sep. 22, 1989, now U.S. Pat. No. 5,010,684, which is a continuation-in-part of U.S. patent application Ser. No. 07/393,841, filed Aug. 7, 1989, now U.S. Pat. No. 4,905,410, which is a continuation of U.S. patent application Ser. No. 07/184,072, filed Apr. 20, 1988, now abandoned.

BACKGROUND OF THE INVENTION

1. Field of the Invention

This invention relates to a capsule for feeding a chemical agent into the phloem layer of a tree or into other wooden elements, such as a telephone pole, a window frame or sill, studs or other elements used in housing construction or the like, etc. The chemical agent may be a herbicide, if the treatment is designed to kill a tree, a fungicide or other medicant or nutrient, if the treatment is designed to cure a tree from a disease or deficiency, or a wood preservative or insecticide, etc., if the treatment is used in some other type of wooden element.

2. Description of Related Art

The prior art relating to implantation treatments typically involves either injection of a cartridge into a tree without preparing a pre-drilled hole in the tree, or implantation of a capsule in a pre-drilled hole in a tree. Examples of prior art devices for such treatment are set forth below.

U.S. Pat. No. 3,691,683 discloses a cartridge containing a chemical liquid agent where the cartridge is hammered into a tree so that it fractures upon impact. However, the cartridge is inserted only half-way in the tree. Therefore, upon fracture, much of the liquid agent is wasted on the surface of the tree, where it also presents a hazard to the person making the injection.

U.S. Pat. No. 4,308,689 discloses a tree treatment capsule for insertion into a pre-drilled hole in a tree. The capsule is made of a frangible material and contains a liquid agent so that an impact force applied to an end cap of the capsule causes breaking of the capsule. This known capsule is disadvantageous since it begins to break near the bore opening. The capsule thus presents the risk that the liquid agent will be exposed to areas outside of the bore opening. The end cap of the known capsule also requires a very complicated structural design which renders the capsule expensive to manufacture.

SUMMARY OF THE INVENTION

The present invention concerns a capsule adapted for insertion into a bore of a tree or other wooden element and includes a head element, a shank portion attached to the head element and having an internal cavity, a chemical agent disposed in the cavity, and a plug sealingly closing an opening of the shank portion in an end thereof which is remote from the head element. The plug is tapered from a diameter larger than the diameter of the opening. The head element, chemical agent and plug form a self-contained capsule which is insertable as a unit into the bore in the wooden element to a position in the bore where the plug abuts a wall of the bore. In one embodiment, the shank portion is made of a frangible material whereby an impact force applied to the head element causes the shank portion to move towards the plug such that the plug expands the opening of the shank portion and breaks it to permit the chemical agent to mix with the sap of a tree or, otherwise, enter and be absorbed into a wooden element. In a second embodiment, a torsional force is applied to the head element to move the shank portion towards the plug.

One particular object of the present invention is to construct a self-contained capsule for treating trees or other wooden elements which is simple and economical.

It is a further object of the invention to construct a self-contained capsule which contains a chemical treatment agent and which is capable of being broken in a bore without any risk of exposing the chemical agent to areas outside of the bore opening.

Other objects and advantages of the present invention will become apparent from the following description when considered in conjunction with the accompanying drawing figures.

BRIEF DESCRIPTION OF THE DRAWINGS

FIG. 1 is an exploded plan view, partly in cross section, of a first capsule embodiment according to the present invention showing a tree as being treated by the capsule;

FIG. 2 is a longitudinal plan view of an assembled capsule of FIG. 1 shown in a first stage of insertion in a bore of the tree;

FIG. 3 is a longitudinal plan view of an assembled capsule of FIG. 1 shown in a second stage of insertion in the bore in the tree;

FIG. 4 is a cross sectional view, taken along line IV—IV of FIG. 3;

DESCRIPTION OF THE PREFERRED EMBODIMENTS

Figure 5:
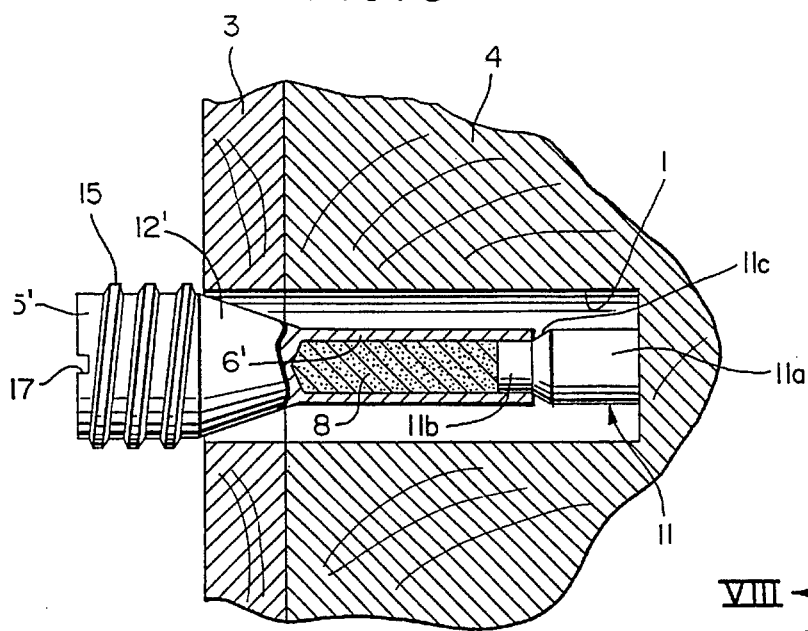
FIG. 5 is a longitudinal plan view of a second capsule embodiment, according to the present invention, before its insertion into a bore in a tree.

As illustrated in FIGS. 1 and 2, the present invention is embodied in a tree treatment capsule adapted for insertion into a pre-drilled bore 1 in the trunk of a tree 2 to be treated. As is seen in FIG. 2, the bore 1 is dimensioned to extend through the bark 3 and into the phloem layer 4 of the tree 2. The capsule includes a solid, cylindrical head element 5 having a hollow shank portion 6 rigidly attached thereto. The shank portion 6 is preferably integrally made with the head element 5. The head element 5 has a diameter larger than the diameter of bore 1, whereas the shank portion 6 has a diameter smaller than the diameter of bore 1.

The shank portion 6 forms an internal cavity 7 for containing a chemical agent 8. The shank portion has an open end 9, the opening 10 of which sealingly receives a solid plug 11. In order to provide a superior seal, plug 11 may be adhesively secured in the opening 10. The plug 11 has two cylindrical portions 11a and 11b. Cylindrical portion 11a has the same diameter as the shank portion 6 whereas the portion 11b has a diameter coinciding with the diameter of the opening 10. The portions 11a and 11b are joined with one another by a tapered transitional portion 11c in order to obtain a tight fit between the portion 11c and the opening 10. The portions 11a, 11b and 11c are preferably made integrally with one another.

The total length of the assembled capsule is preferably slightly larger than the length of bore 1 such that part of the head element 5 will protrude outside of the opening of bore 1 when the capsule is fully inserted into the bore, as is shown in FIG. 2.

The head element 5 is joined to the shank portion 6 by a tapered, solid transitional portion 12 in order to obtain a tight fit between the portion 12 and the opening of bore 1. The head element 5, transitional portion 12 and shank portion 6 are preferably made integrally with one another.

The taper of the portion 11c and 12 may be either curved or straight.

All details of the capsule are made of a hard, brittle, breakable and non-elastic material such as, for instance, wood or fiber wood, or of brittle, breakable plastic material.

The chemical agent may be of any known kind such as, for instance a herbicide, a fungicide, an insecticide or a wood preservative. According to the invention, the chemical agent may be in the form of a tablet or a powder. Alternatively, it may be in a pasty-like or liquid form.

In order to assemble the capsule, the chemical agent 8 is introduced into the cavity 7 and the plug 11 is then attached to seal the opening 10. The capsule is thereafter inserted into the bore 1 until the plug 11 abuts a wall of the bore 1. The plug 11 may, for instance, abut the bottom wall 1a as is shown in FIG. 2. Thereafter, an impact force is applied, for instance, by hammering, as shown by arrow 13, to the head element 5 causing it, and the shank portion 6, to move towards the plug 11 such that the shank portion 6 climbs up along the taper of the plug 11. The plug 11, therefore, expands the opening 10 and breaks the shank portion 6 into tongues 6a, as is shown in FIGS. 3 and 4. The tongues 6a form passages therebetween to permit the chemical agent 8 to mix with the sap of the tree 2.

Since the diameter of the head element 5 is larger than the diameter of bore 1, a very tight fit will be obtained between the head element 5 and the opening of bore 1. This will hold the capsule very firmly in the bore 1. The tongues 6a will also exert pressure against the side walls of the bore 1, thus contributing to retaining the capsule firmly in the bore.

Figure 6:
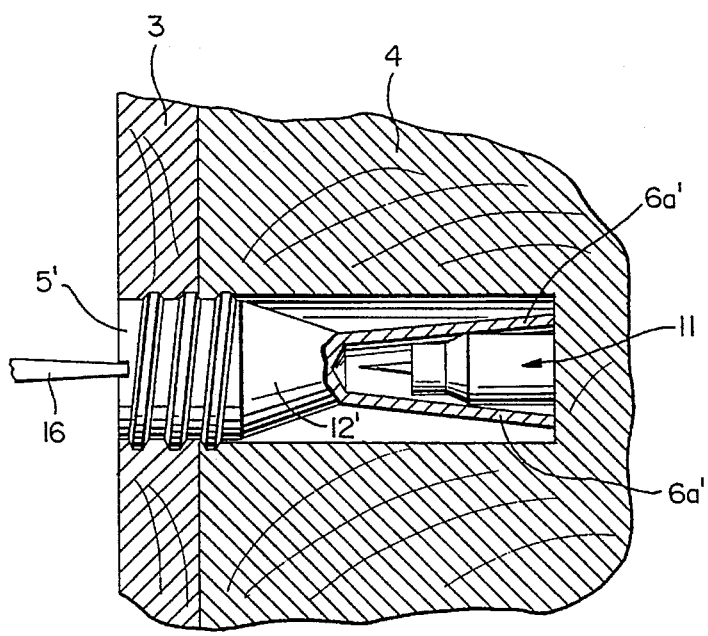
FIG. 6 is a longitudinal plan view of the second capsule embodiment after it has been fully inserted into the bore.

Referring now to the second tree treatment capsule embodiment shown in FIGS. 5 and 6, it should first be noted that similar reference numbers have been used to designate elements of the second embodiment which are the same as or similar to elements of the first embodiment described above. Head 5' of the second capsule embodiment differs, however, from the previously described head element 5 in that a wide screw thread 15 having a large pitch is preferably integrally formed with the head element and disposed about the circumferential exterior thereof. In a manner similar to the previously described embodiment, head 5' is preferably joined to shank 6' by a tapered, solid transitional portion 12'. In this embodiment, however, portion 12' simply aids in centering the capsule in bore 1, as will become clear.

In order to cause head 5' and shank 6' to move towards solid plug 11 in the second embodiment, a screw action rather than an impact force is utilized. In particular, a driving tool 16, such as a screwdriver or the like, is inserted into a corresponding notch or other tool receiving recess 17 formed in the end of head 5' protruding from bore 1. It should be noted that any particular driving tool and corresponding recess will be suitable so long as torsional force can be transmitted from the driving tool to head 5' by the recess. To remove the head and shank towards plug 11, torsional force is applied to head 5' by twisting driving tool 16 after its insertion in notch 17. Driving tool 16 is simultaneously forced towards solid plug 11 so that thread 15 digs into bark 3 and phloem layer 4, thereby drawing head element 5' into the bore 1. As head element 5' is drawn into the bore 1, hollow shank 6' is moved towards plug 11 such that the shank climbs up along the taper of plug 11 and the plug expands the opening and breaks the shank portion into tongues 6a' as FIG. 6 illustrates These tongues 6a' form passages therebetween to permit the chemical agent to mix with the sap of tree 2 or be absorbed into the wood fiber of another type of wooden element in a manner similar to tongues 6a of the first tree treatment capsule embodiment.

As was the case with the first capsule embodiment, all parts of the second capsule embodiment can be made, for example, of wood or of plastic material. In the event the capsule is to be made of plastic, it is preferable to form shank 6 or 6' of a brittle, easily breakable plastic material, such as polystyrene. This assures that shank 6 or 6' will break without requiring an excessive impact or torsional force application. However, in order to effect a better seal between head 5 or 5' and the outer end of bore 1, and thereby lessen the likelihood that a mixture of chemical agent 8 and sap of the tree will leak out of the bore past the head, it is preferable to make head 5 or 5' of a somewhat more flexible or pliable material than polystyrene. A butadiene-styrene copolymer, for example, is suitable for use as the material from which head 5 is formed. Plug 11 can be formed of either polystyrene or a butadiene-styrene copolymer.

Figure 7:
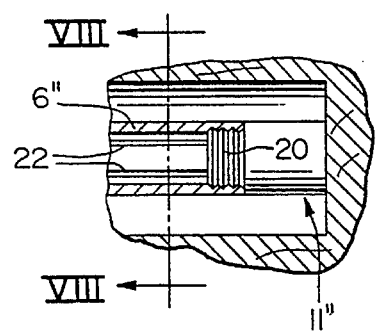
FIG. 7 is a partial longitudinal view of an alternative plug and shank portion construction which can be used with either the first or the second capsule embodiment.
Figure 8:
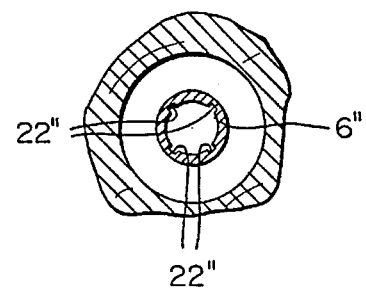
FIG. 8 is a cross sectional view, taken along line VIII—VIII of FIG. 7.

Referring now to FIGS. 7 and 8, an alternative plug and shank portion construction is illustrated. Referring to FIG. 7, a plug 11" is shown as having end 20 with fine, low pitch threads disposed about the circumference thereof. End 20 is engaged by the screw threads with the opening of shank 6". Such a threaded connection between the plug and the open end of the shank helps to prevent the tree treatment agent from escaping from the interior of the capsule.

As FIGS. 7 and 8 show, the radially interior surface of shank 6" is provided with longitudinally extending, recessed score lines or slots 22". As the head element of the capsule is forced into bore 1 towards plug 11" by either an impact or a torsional force as previously described, rather than being broken into tongues, shank 6" will be broken along slots 22, and chemical agent 8 will be released through the broken slots.

Figure 9:
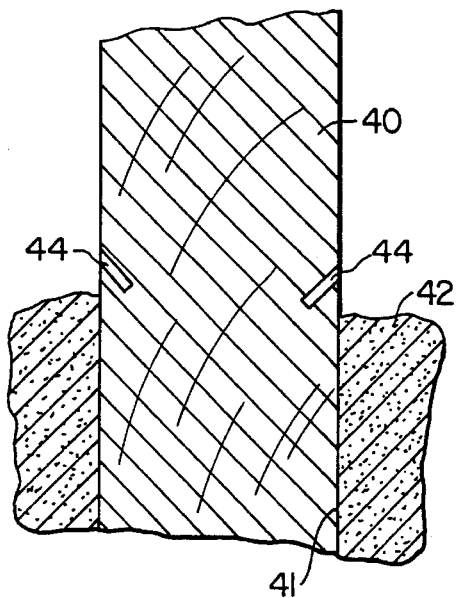
FIG. 9 is a cross sectional view showing a wooden pole, such as a telephone pole, as being the wooden element into which the capsules of FIGS. 1–8 may be inserted.

FIG. 9, as noted above, shows an alternative use for the capsules shown in FIGS. 1–8. As shown in FIG. 9, a wooden telephone pole, or other type of pole, 40 is received in a hole 41 formed in the ground 42. At or near ground level, the pole 40 is provided with drilled or punched bores 44. The bores 44 may, for example, be formed by a punch hammer as described by U.S. Patent No. 5,086,584. A capsule in accordance with any of the embodiments illustrated in FIGS.

1–8 may be inserted into each of the bores 44. When such a capsule is fully inserted into a bore 44, the chemical agent, which may, for example, be a wood preservative or insecticide, is released from the capsule and absorbed in the porous wood fiber of the pole 40.

Figure 10:
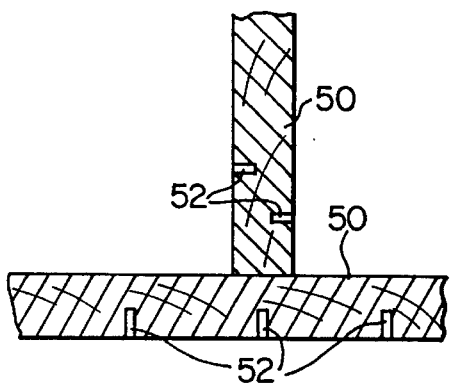
FIG. 10 is a cross sectional view of other types wooden elements, such as those used in construction, into which the capsules of FIGS. 1–8 may be inserted.

Wooden studs 50, used, for example, in housing construction, are shown in FIG. 10 as having bores 52 formed therein. Each of the bores 52 is adapted to receive one of the capsules as illustrated in FIGS. 1–8. Again, the chemical agent which is contained in the capsules may be a wood preservative, an insecticide, or the like.

Figure 11:
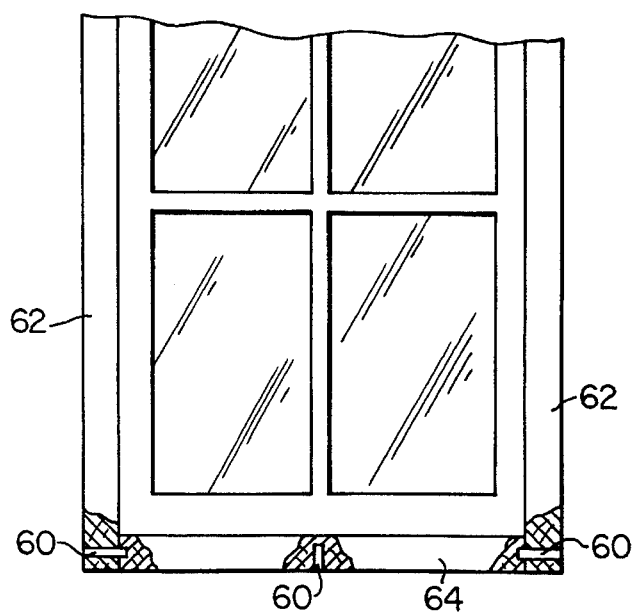
FIG. 11 is a view, partly in section, showing a window frame as being the wooden element into which the capsules of FIGS. 1–8 may be inserted.

FIG. 11 shows yet another use for capsules such as those shown in FIGS. 1–8. In FIG. 11, bores 60 are formed in window frame 62 and sill 64. Each of the bores 60 is adapted to receive a capsule as illustrated in FIGS. 1–8. The chemical agent which is contained within the capsule may, for example, be an insecticide or a wood preservative.

Various modifications to the particular constructions described above will be apparent to those skilled in the art. Such modifications are intended to be covered by the appended claims.

I claim:

1. A capsule for insertion into a bore in a wooden element comprising:
    a head element,
    a shank portion of smaller diameter integrally formed with said head element by a tapered portion, said shank portion having an internal cavity,
    a chemical agent for treating the wood element disposed in said internal cavity, said shank portion having an end remote from said head element, said end having an opening for said internal cavity, and
    a tapered plug sealingly closing said opening, said plug being tapered from a diameter larger than the diameter of said opening to a diameter smaller than the diameter of said opening such that said plug is only partially insertable into said opening in order to obtain a tight fit between said plug and said opening,
    said head element, said shank portion, said chemical agent and said plug forming a self-contained capsule which is insertable as a unit into a bore in the wooden element having a diameter greater than the diameter of the shank portion and a length shorter than the length of the capsule so that when inserted into the wooden element, said plug abuts an end wall of the bore, said shank portion being frangible so that when a force is applied to said head element to move said shank portion towards said plug, said plug expands said opening and breaks said shank portion to enable the chemical agent to pass out of the shank portion into an annular space defined between the shank portion and the bore, said capsule, when fully inserted into the bore having the head element seal the bore to prevent any leakage of the chemical agent from the bore.

2. A capsule as defined by claim 1, wherein said shank portion is formed of polystyrene material.

3. A capsule as defined by claim 2, and further comprising a screw thread disposed about the circumferential exterior of said head element.

4. A capsule as defined by claim 1, wherein said head element is formed of a copolymer of butadiene and styrene.

5. A capsule as defined by claim 1, and further comprising a screw thread disposed about the circumferential exterior of said head element.

6. A capsule as defined by claim 5, wherein the plug is threaded into the open end of the shank portion.

7. A capsule as defined by claim 5, wherein said shank portion is formed of polystyrene material.

8. A capsule as defined by claim 5, wherein said head element is formed of a copolymer of butadiene and styrene.

9. A capsule as defined by claim 1, wherein the shank portion is longitudinally scored.

10. A method of treating a wooden element comprising the steps of:
    providing a capsule including a head, a frangible shank, of smaller diameter then the head, integrally formed with said head and having an internal cavity, the portion of the capsule between the head and the shank being tapered, a chemical agent disposed in said internal cavity, and a tapered plug in an opening of said internal cavity at an end of said shank portion remote from said head, said plug sealingly closing said opening and retaining said chemical agent in said internal cavity,
    forming, in the wooden element, a bore having a diameter larger than the diameter of the shank and smaller than the diameter of the head and having a length less than the length of the capsule and plug,
    inserting said capsule into the bore formed in said wooden element so that said plug abuts an end wall of said bore with the head projecting from the bore, and
    forcing said head to move into the bore with said head and said shank moving towards said plug until the capsule is fully inserted into the bore so that when the capsule is fully inserted into the bore, the head closes off and seals said bore, the shank being split, releasing said chemical agent from said internal cavity into an annular space defined between the diameter of the bore and the diameter of the shank, leakage of said chemical agent from said bore being prevented by the seal provided by the head of the capsule.

11. A method according to claim 10 wherein the capsule is composed of plastic material.

12. A method according to claim 10 wherein the plastic material comprises polystyrene.

13. A method according to claim 10 wherein the plastic material for the shank is polystyrene and for the head is a copolymer of polystyrene and butadiene.

14. A method according to claim 10 wherein the capsule is threaded into the bore during insertion.

15. A capsule inserted into a bore in a wooden element, the capsule comprising:
    a head element,
    a shank portion of smaller diameter integrally formed with said head element by a tapered portion, said shank portion having an internal cavity,
    a chemical agent for treating the wooden element disposed in said internal cavity,
    said shank portion having an end remote from said head element, said end having an opening for said internal cavity,
    a tapered plug sealingly closing said opening, said plug being tapered from a diameter larger than the diameter of said opening to a diameter smaller than the diameter of said opening such that said plug is only partially insertable into said opening in order to obtain a tight fit between said plug and said opening,
    said head element, said shank portion, said chemical agent and said plug forming a self-contained capsule which is inserted as a unit into the bore in the wooden element having a diameter greater than the diameter of the shank portion and a length shorter than the length of the capsule so that when inserted into the wooden element, said plug abuts an end wall of the bore, said shank portion being frangible so that when a force is applied to said head element to move said shank portion towards said plug, said plug expands said opening and breaks said shank portion to enable the chemical agent to pass out of the shank portion into an annular space defined between the shank portion and the bore, said capsule being fully inserted into the bore with the head element sealing the bore to prevent any leakage of the chemical agent from the bore.

16. A capsule inserted into a bore in a wooden element as defined in claim 15, wherein the plug is threaded into the end of the shank portion.

17. A capsule inserted into a bore in a wooden element as defined in claim 15, wherein the shank portion is longitudinally scored.

* * * * *